H. PADDOCK.
Platform Scales.
No. 151,241.     Fig. 1.     Patented May 26, 1874.
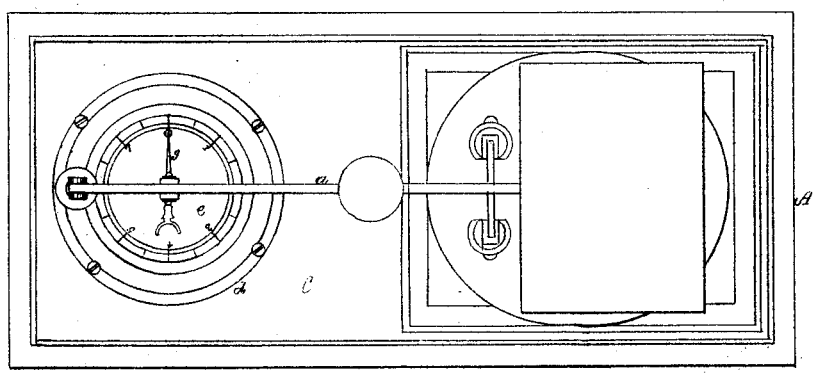
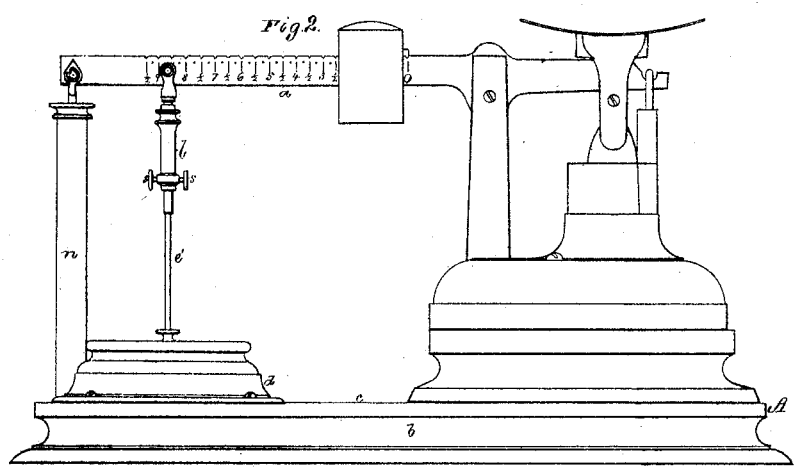
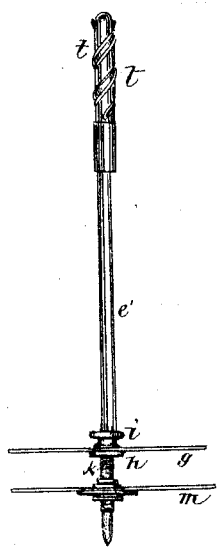
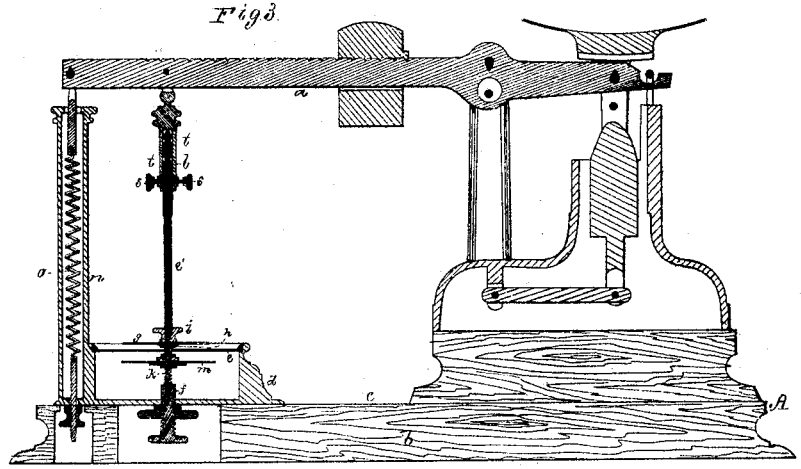
Witnesses.     Harvelin Paddock.
S. N. Piper
L. N. Möller
by his attorney.

UNITED STATES PATENT OFFICE.

HARVELIN PADDOCK, OF ST. JOHNSBURY, VERMONT, ASSIGNOR TO HIMSELF AND FRANKLIN FAIRBANKS, OF SAME PLACE.

IMPROVEMENT IN PLATFORM-SCALES.

Specification forming part of Letters Patent No. 151,241, dated May 26, 1874; application filed December 26, 1871.

*To all whom it may concern:*

Be it known that I, HARVELIN PADDOCK, of St. Johnsbury, of the county of Caledonia and State of Vermont, have made a new and useful invention relating to Scales for Weighing Heavy Bodies; and I do hereby declare the same to be fully described in the following specification and represented in the accompanying drawings, in which—

Figure 1 is a top view, Fig. 2 a side elevation, and Fig. 3 a longitudinal section, of a "postage-scale" provided with my said invention, which is equally applicable to various other kinds of weighing scales or apparatus provided with a beam, or graduated lever, or steelyard. Fig. 4 is a view of the vertical index-shaft enlarged.

Similar letters of reference indicate like parts in all the figures.

For a long time it has been deemed desirable to combine with the beam of a platform-scale an apparatus to rapidly and correctly indicate the weight of an article when on the platform, so that while a load may be in the act of passing over a platform its weight may be ascertained.

Most, if not all, attempts heretofore made have proven to be failures.

I have combined important elements never before used together, and have invented an addition thereto. The device thus obtained overcomes the difficulties.

The following description, in connection with the drawings, will explain how to carry out the invention.

Within a tubular standard, $n$, there is fixed at its lower end a helical spring, $o$, which, at its upper end, is connected, as shown, with the end of the scale-beam $a$. What is termed by scale-makers a "gravity-arm" may be substituted for such spring.

The purpose of the spring is to counterbalance the weight put at any time on the platform of the scale-beam, or the excess thereof above that indicated by the poise, the extent of upward movements of the longer arm of the beam varying according as the loads on the platform vary.

Underneath the beam $a$ is arranged vertically an index-pointer shaft, $e'$, carrying an index-pointer, $g$. The means of supporting the shaft and clamping the index-pointer, with respect to the shaft, should admit of the adjustment of the pointer in altitude, as well as to the zero of the dial, after the scale may have been sealed. The index-pointer shaft, from its upper end downward a proper distance, has two helical grooves, $t\ t$, of a long pitch. This part of the shaft extends into a tubular hanger or sleeve, $l$, which is suspended from the scale-beam, and carrying pointed screws $s\ s$, extending horizontally into the helical grooves, the whole being so that the beam while moving vertically shall cause the index-pointer shaft to revolve. On the said shaft $e'$, and below the dial, is fixed a fly-wheel, $m$, which is an important adjunct.

On a load being put upon the platform the beam will rise, thereby communicating motion to the index-pointer shaft. Without the fly-wheel $m$ on the shaft, the motion would be irregular and jerky; with it, I find that the settlement of the index-pointer in the right position to indicate the weight is immediately accomplished.

The beam, on rising, tends to cause the index-pointer shaft and fly-wheel to turn rapidly. When the beam, having moved past its proper position, vibrates in the opposite direction, the momentum of the fly-wheel has to be overcome. This aids in reducing the vibration.

If one helical groove, $t$, and one screw or projection, $s\ s$, is used with the hanger and the index-pointer shaft to effect the turning of the latter, the side strain and friction are much greater.

I claim as my invention—

1. The shaft $e'$, carrying index-finger, and having helical grooves $t\ t$, receiving points or projections $s\ s$, which are moved up and down, in combination with the scale-beam $a$ and spring $o$ or its equivalent, as and for the purposes specified.

2. The tubular hanger or sleeve $l$ carried on the scale-beam $a$, and forming the upper bearing of the helically-grooved index-shaft $e'$, in combination with the lower bearing $f$ and screws $s\ s$, as herein specified.

3. The fly-wheel $m$, mounted below the dial $e$ on the helically-grooved index-shaft $e'$, in combination with the scale-beam $a$, spring $o$, and screws or internal projections $s\ s$, the latter being raised and depressed by the beam, and imparting motion to the loaded index-shaft, as specified.

<p style="text-align:right">HARVELIN PADDOCK.</p>

Witnesses:
    E. D. BLODGETT,
    D. D. PATTERSON.